United States Patent [19]

Elgie

[11] 4,407,982
[45] Oct. 4, 1983

[54] PROCESS FOR THE MANUFACTURE OF FOAMED STRUCTURES

[75] Inventor: John M. Elgie, Kingston, Canada

[73] Assignee: Du Pont Canada Inc., Mississauga, Canada

[21] Appl. No.: 345,616

[22] Filed: Feb. 3, 1982

[30] Foreign Application Priority Data

Feb. 6, 1981 [GB] United Kingdom ............... 81003794

[51] Int. Cl.³ .................... C08G 18/14; C08G 18/00
[52] U.S. Cl. ................................ 521/122; 521/79; 521/91; 521/131; 521/144; 252/182
[58] Field of Search ............... 521/122, 131, 91, 144, 521/79

[56] References Cited

U.S. PATENT DOCUMENTS

| | | | |
|---|---|---|---|
| 3,072,582 | 1/1963 | Frost | 260/2.5 |
| 4,048,208 | 9/1977 | Spicuzza et al. | 521/79 |
| 4,101,467 | 7/1978 | Park et al. | 521/79 |
| 4,217,422 | 8/1980 | Wasilczyk | 521/122 |
| 4,275,172 | 6/1981 | Barth et al. | 521/122 |
| 4,278,770 | 7/1981 | Chandalia et al. | 521/122 |
| 4,293,657 | 10/1981 | Nissen et al. | 521/122 |
| 4,317,888 | 3/1982 | Watanabe et al. | 521/79 |

*Primary Examiner*—H. S. Cockeram

[57] ABSTRACT

An improvement in a process for the production of polyurethane foam is disclosed, in which a first component is admixed and reacted with a second component and in which the first component has a viscosity at least two times the viscosity of the second component, thereby resulting in a nonuniform distribution of the cells of the foam. The improvement comprises admixing the second component with 1–5%, by weight, of the second component, of fumed silica prior to admixing the first and second components. The amount of fumed silica is controlled so that the polyurethane foam subsequently obtained has a substantially uniform distribution of cells. A process for the production of a foamed thermoplastic structure is also disclosed in which at least part of the normally liquid chlorofluorocarbon blowing agent is added as a composition comprising an admixture of 5–99%, by weight, of fumed silica and 1–95%, by weight, of a normally liquid chlorofluorocarbon adsorbed thereon. The composition is in the form of a dry free-flowing powder.

4 Claims, No Drawings

PROCESS FOR THE MANUFACTURE OF FOAMED STRUCTURES

BACKGROUND

The present invention relates to the manufacture of foamed structures. In particular the invention relates to the use of fumed silica, including admixtures of fumed silica and normally liquid chlorofluorocarbons that are in the form of dry free-flowing powders, in the manufacture of such structures.

Foamed structures may be manufactured from many polymers. In some instances, for example the manufacture of polyurethane foams, the foaming of the polymer is accomplished essentially simultaneously with the polymerization of the polymer. The constituents of the foamed polymer, usually in the form of prepolymers and gaseous or liquid blowing agents, are admixed under conditions that facilitate both polymerization to form the polymer and foaming so that the result is a foamed structure. Such techniques are known in the art, for example, as described in Canadian Pat. Nos. 703,814 and 705,938, both in the name of C. B. Frost, which issued Feb. 16, 1965 and Mar. 16, 1965, respectively.

In other instances, for example the manufacture of foamed structures from thermoplastic polymers a solid, liquid, or gaseous blowing agent is admixed with solid polymer and extruded to produce a foamed structure or such blowing agents are injected into molten polymer prior to extrusion of the polymer.

Foamed structures are manufactured commercially for a wide variety of end uses, including the construction industry, e.g., as insulation and in wall structures, in the packaging industry, e.g., as containers, in the furniture industry and to make more economical use of polymers.

An important segment of the commercial foamed structure market is that in which the polymeric component is a polyurethane. Such structures are usually manufactured by admixing a polyol, e.g., polyhydroxy compound of the polyether type, and an isocyanate, e.g., toluene diisocyanate, 4,4-diphenylmethane diisocyanate or a polyisocyanate prepolymer. The blowing agent, especially in the form of a normally liquid chlorofluorocarbon, is usually added with the polyol. Other additives, especially water and a polymerization catalyst, may also be added with the polyol. On mixing the polyol and polyisocyanate, an exothermic reaction occurs. The heat liberated causes the normally liquid chlorofluorocarbon to vaporize with the result that a foamed polyurethane product is formed.

While polyols intended for use in the manufacture of polyurethanes are commercially available, polyols may also be available from other sources, for instance, by-products of the manufacture of other materials. Examples of such by-products are polyol by-products obtained from processes for the manufacture of polyesters. With some grades of polyols, frequently the less expensive grades, the foamed polyurethane obtained may be of poor or unacceptable quality for commercial use. In particular such poor or unacceptable quality foams may have a nonuniform distribution of the cells of the foam. Improvements in the manufacture of foamed polyurethane would be beneficial, especially with regard to the economics of the manufacture of foams of commercially acceptable quality.

It has now been found that the addition of small amounts of fumed silica to the constituents used to manufacture foamed polyurethane may improve the quality of the product obtained. It has further been found that in the manufacture of structures of foamed polymers, especially thermoplastic polymers, admixtures of fumed silica and normally liquid chlorofluorocarbons containing at least 4.5% by weight of silica may be used, the chlorofluorocarbon being the blowing agent used in the manufacture of the foam. Such admixtures are in the form of dry free-flowing powders, thereby permitting the addition of the blowing agent to the polymer in the form of a powder.

SUMMARY OF THE INVENTION

Accordingly the present invention provides a process for the production of polyurethane foam in which a first component is admixed and reacted with a second component and in which the first component has a viscosity at least two times the viscosity of the second component, the difference in the viscosities being such that the resultant polyurethane foam has a non-uniform distribution of cells, the improvement comprising admixing the second component with 1–5%, by weight of the second component, of fumed silica prior to admixing said first and second components, and controlling the amount of silica so admixed so that the polyurethane foam subsequently obtained has a substantially uniform distribution of cells.

In an embodiment of the process of the present invention, fumed silica and normally liquid chlorofluorocarbon used as blowing agent in the process are added, in combination, to the second component.

The present invention also provides in a process for the production of a foamed thermoplastic polymer structure in which a normally liquid chlorofluorocarbon is used as blowing agent, the step consisting of using as at least part of the blowing agent a composition comprising an admixture of 5–99%, by weight, of fumed silica and 1–95%, by weight, of a normally liquid chlorofluorocarbon adsorbed thereon, said composition being in the form of a dry free-flowing powder.

In embodiments of the processes of the present invention, the normally liquid chlorofluorocarbon is trichloromonofluoromethane, dichlorodifluoromethane, monochlorodifluoromethane, trichlorotrifluoroethane or dichlorotetrafluoroethane, or mixtures thereof. In addition the chlorofluorocarbon may be admixed with other liquid blowing agents, e.g., methylene chloride, pentane and hexane.

DETAILED DESCRIPTION

The silica used in processes of the present invention is fumed silica which is defined in the Condensed Chemical Dictionary, 8th Edition, Van Nostrand Reinhold Company of New York, N.Y. as being a colloidal form of silica made by combustion of silicon tetrachloride in hydrogen-oxygen furnaces. Fumed silica is a fine white powder and is available commercially, for example from Cabot Corporation of Boston, Mass., U.S.A. under the trade mark CAB-O-SIL ®.

The production of polyurethane foam according to the present invention relates to a process in which a first component is admixed and reacted with a second component, the first component having a viscosity at least two times the viscosity of the second component. Usually the first component will be the isocyanate component and the second component will be the polyol component.

The isocyanates that may be used in the manufacture of polyisocyanates are known to those skilled in the art. Such isocyanates include isocyanates of relatively low molecular weight, for example toluene diisocyanate and 4,4-diphenylmethane diisocyanate, and isocyanates of relatively high molecular weight, especially in the form of prepolymer containing isocyanate groups, for example polyesters containing isocyanate groups.

The polyols that may be used in the manufacture of polyisocyanates are known or will be apparent to those skilled in the art. Examples of such polyols are polyester polyols and polyether polyols. It is to be noted however that the present invention may permit the use of polyols that traditionally have not been used in the manufacture of polyisocyanates, the present invention being applicable to the manufacture of polyisocyanates in which the first component, e.g., the isocyanate component, has a viscosity at least two times that of the second component, e.g., the polyol component.

The polyol component may also contain additives, particularly catalysts, to control or facilitate polymerization with the isocyanate and/or to alter the properties of the resultant polyurethane foam. Examples of catalysts are amine catalysts, e.g., triethylene diamine, and organometallic catalysts, e.g., stannous octoate or dibutyl tin laurate. In addition the polyol component will usually contain the foaming agent, examples of which are chlorotrifluoromethane, trichlorotrifluoroethane, dichlorotetrafluoroethane and methylene chloride as well as non-halogenated blowing agents, e.g. hexane and pentane.

In the manufacture of polyurethane foams according to the present invention fumed silica is added with the second or lower viscosity component. Fumed silica has been defined hereinbefore. The fumed silica is admixed with the second component, prior to admixing of the first and second components, in amounts in the range of 1–5% by weight of the second component. The amount of fumed silica actually added will depend on the nature of the first and second components and is controlled so that the resultant polyurethane foam has a substantially uniform distribution of cells. The distribution of cells in the foamed product may be monitored by visual or other inspection.

As is exemplified hereinafter the addition of fumed silica may be controlled so as to effect a significant improvement in the uniformity of the cells of the foam.

When the blowing agent is a normally liquid chlorofluorocarbon the fumed silica and blowing agent may be added to the second component separately or, alternatively, fumed silica and blowing agent may be added in combination to the second component.

The present invention also provides a process for the production of a foamed thermoplastic polymer structure in which a normally liquid chlorofluorocarbon is used as blowing agent. In this embodiment at least part of the blowing agent is used in the form of a free-flowing powder comprising an admixture of 5–99%, by weight, of fumed silica and 1–95%, by weight, of a normally liquid chlorofluorocarbon adsorbed thereon. Admixtures containing 80–95% chlorofluorocarbon are preferred. The powder may be admixed with the thermoplastic polymer prior to feeding the resultant mixture to the extruder used in the forming of the foamed thermoplastic polymer structure or the powder may be separately metered into such an extruder for example into a melt zone, and especially into a mixing zone, of the extruder, or preblended with polymer and then fed to the extruder through, for example the hopper of the extruder.

A variety of thermoplastic polymers may be used, for example polyethylene, polypropylene, polystyrene and polyamide.

In the production of foamed thermoplastic polymer structures the amount of fumed silica and normally liquid chlorofluorocarbon is controlled so that the resultant foamed structure has the desired properties, especially the desired density. Relatively low or relatively high amounts of fumed silica and of chlorofluorocarbon may be used. The foamed thermoplastic polymer structures may be manufactured using extrusion processes, for example, processes used for the manufacture of low and high density foam sheets and films, injection moulding processes including processes for the manufacture of structural foams, and rotational moulding processes.

Examples of normally liquid chlorofluorocarbons are trichloromonofluoromethane (commercially available as FREON ® 11 blowing agent), trichlorotrifluoroethane (commercially available as FREON ® 113 blowing agent) and dichlorotrifluoroethane (FREON ® 114 blowing agent), and mixtures thereof. FREON ® blowing agents are available from Du Pont Canada Inc. of Montreal, P.Q., Canada.

The present invention is further illustrated by the following examples.

EXAMPLE I

Polyurethane foams were prepared using the following procedure:

One of two polymeric isocyanates, available as PAPI ®-135 and PAPI-580, both believed to be of the polymethylene polyphenylisocyanate type and available from the Upjohn Company of Kalamazoo, Mich., U.S.A., were used as the so-called "A-side" for the process for the manufacture of the polyurethane foam.

A mixture of 22.0 parts, by weight, of a polyol obtained from the Upjohn Company under the trade designation "091", 4.4 parts of a polyol obtained from Upjohn Company under the trade designation "097-1", 2.0 parts of a silicone obtained from Dow Corning Canada Inc. of Streetsville, Ontario, Canada under the trade designation "Q2-5103", 24.2 parts of FREON ®11B blowing agent (trichloromonofluoromethane) and fumed silica, if any, was prepared. The fumed silica used was that available as CAB-O-SIL ®EH5. This mixture is the so called "B-side" for the process for the manufacture of the polyurethane foam.

To prepare the polyurethane foam, weighed samples of the "A-side" and "B-side" were admixed in a ratio of 0.39:1, stirred vigorously and transferred to a mould to permit the foam to form.

Further experimental details and the results obtained are given in TABLE I.

The polyurethane foam made using the silica was better in appearance than that made in the absence of silica.

EXAMPLE II

The general procedure of Example I was repeated on commercial-scale apparatus. The isocyanate used in the A-side was RUBMINATE ® M, which is available from Rubicon Chemical Co. Inc. of Wilmington, Del., U.S.A.

The A-side had a viscosity of 220 mPa·s. The B-side contained CAB-O-SIL ® EH5 silica and had a viscosity of 195 mPa·s; the viscosity before addition of the silica was 60 mPa·s. The A and B sides were mixed in a ratio of 0.39:1. The foam showed a good rise.

The foam obtained had a density of 2.50 and a good appearance with a very fine uniform cell structure.

EXAMPLE III

A blowing agent was prepared by admixing about 6%, by weight, of CAB-O-SIL ®EH5 silica with about 94%, by weight, of trichloromonofluoromethane. The dry, free-flowing powder obtained was admixed with a polyethylene which was an ethylene/butene-1 copolymer having a density of 0.930 g/cm$^3$ and a melt index, as measured by the procedure of ASTM D-1238, condition E, of 5.0 dg/min. About 15 parts, by weight, of powder were admixed with about 85 parts, by weight, of the copolymer. The resultant admixture was then placed in a sealed pressure press and heated above the melting point of the copolymer. The pressure on the press was released, whereby a foamed product was obtained. A control experiment conducted in the absence of blowing agent did not yield a foamed product.

This example illustrates that blowing agents prepared from silica and normally liquid trichloromonofluoromethane are capable of being used to form thermoplastic polymers.

TABLE I

| Run No.* | Silica in B-Side (%) | B-side Viscosity** mPa.s | A-side Viscosity mPa.s | Foam Density | Foam*** Rise |
|---|---|---|---|---|---|
| 1 | 0 | 54 | 360 | 2.50 | Fair |
| 1A | 1.4 | 340 | 360 | 2.47 | Good |
| 2 | 0 | 54 | 1240 | 2.3 | Fair |
| 2A | 1.6 | 1180 | 1240 | 2.4 | Good |
| 3 | 0 | 70 | 360 | 2.3 | Fair |
| 3A | 1.68 | 350 | 360 | 2.4 | Good |
| 4 | 0 | 70 | 810 | 2.35 | Fair |
| 4A | 1.75 | 900 | 810 | 2.4 | Good |

*In Runs 1, 1A, 3 and 3A, the A-side was made using PAPI-135; PAPI-580 was used in the other runs.
**Measured at 70° F.
***A measure of cell formation.

TABLE I-continued

| Run No. | Foam Appearance | Comments |
|---|---|---|
| 1 | Poor | Large cells |
| 1A | Better than Run 1 | Smaller, more uniform cells |
| 2 | Poor | Large cells |
| 2A | Better than Run 2 | Smaller, more uniform cells |
| 3 | Poor | Large cells |
| 3A | Good | Fine cells |
| 4 | Poor | Large cells |
| 4A | Better than Run 4 | Smaller, more uniform cells |

I claim:

1. In a process for the production of polyurethane foam in which a first component is admixed and reacted, in the presence of a normally liquid blowing agent, with a second component said first component being an isocyanate, and said second component being a polyol and in which the first component has a viscosity at least two times the viscosity of the second component, the difference in the viscosities being such that but for the improvement hereinafter set forth the resultant polyurethane foam would have nonuniform distribution of cells, the improvement comprising admixing the second component with 1–5%, by weight, of the second component, of fumed silica prior to admixing said first and second components, the amount of silica so admixed being such that the polyurethane foam subsequently obtained has a substantially uniform distribution of cells.

2. The process of claim 1 in which fumed silica and normally liquid chlorofluorocarbon blowing agent are added, in combination, to the second component.

3. The process of claim 1 or claim 2 in which the normally liquid chlorofluorocarbon is selected from the group consisting of trichloromonofluoromethane, dichlorodifluoromethane, monochlorodifluoromethane, trichlorotrifluoroethane and dichlorotetrafluoroethane, and mixtures thereof.

4. The process of claim 2 in which the chlorofluorocarbon is one component of a mixture with another liquid blowing agent.

* * * * *